United States Patent
Leiber

(10) Patent No.: US 11,811,266 B2
(45) Date of Patent: Nov. 7, 2023

(54) INTERNAL STATOR OF A ROTARY FIELD MACHINE HAVING STATOR TOOTH GROUPS EACH CONSISTING OF TWO DIRECTLY ADJACENT TEETH AND A MAGNETIC RETURN

(71) Applicant: IPGATE Capital Holding AG, Pfäffikon (CH)

(72) Inventor: Thomas Leiber, Rogoznica (HR)

(73) Assignee: IPGATE CAPITAL HOLDING AG, Pfaffikon (CH)

(*) Notice: Subject to any disclaimer, the term of this patent is extended or adjusted under 35 U.S.C. 154(b) by 282 days.

(21) Appl. No.: 16/967,802

(22) PCT Filed: Jan. 28, 2019

(86) PCT No.: PCT/EP2019/051964
§ 371 (c)(1),
(2) Date: Aug. 6, 2020

(87) PCT Pub. No.: WO2019/154651
PCT Pub. Date: Aug. 15, 2019

(65) Prior Publication Data
US 2021/0044160 A1    Feb. 11, 2021

(30) Foreign Application Priority Data
Feb. 7, 2018 (DE) ............ 10 2018 102 754.0

(51) Int. Cl.
*H02K 1/14* (2006.01)
*H02K 1/18* (2006.01)
(Continued)

(52) U.S. Cl.
CPC ............ *H02K 1/148* (2013.01); *H02K 1/187* (2013.01); *H02K 3/30* (2013.01); *H02K 3/345* (2013.01); *H02K 2203/12* (2013.01)

(58) Field of Classification Search
CPC .......... H02K 1/148; H02K 1/187; H02K 1/20; H02K 21/225; H02K 2203/12; H02K 3/30; H02K 3/345
See application file for complete search history.

(56) References Cited

U.S. PATENT DOCUMENTS 2,655,613 A    10/1953  Wieseman
6,509,665 B1    1/2003  Nishiyama et al.
(Continued)

FOREIGN PATENT DOCUMENTS

CN    102810964 A    12/2012
CN    105981272 A    9/2016
(Continued)

OTHER PUBLICATIONS

Search Report dated Jul. 2, 2018 in DE Application No. 10 2018 102 754.0.
(Continued)

*Primary Examiner* — Naishadh N Desai
(74) *Attorney, Agent, or Firm* — Panitch Schwarze Belisario & Nadel LLP

(57) ABSTRACT

An internal stator of a rotary field machine has a number of N stator teeth. Two stator teeth each form a number of N/2 tooth groups, wherein one tooth group each is formed by two directly adjacently arranged stator teeth has a pole core and a pole shoe formed thereon, and thus, the inner stator comprises semi-closed grooves. The pole cores are made of a first material, for example, silicon iron. In addition thereto, an intermediate element extending in the axial direction of the stator is arranged between each of two stator teeth of two adjacent tooth groups, which is made of a different material. The second material of the intermediate element is different from the first material of the stator teeth.

42 Claims, 8 Drawing Sheets

Figure 1:
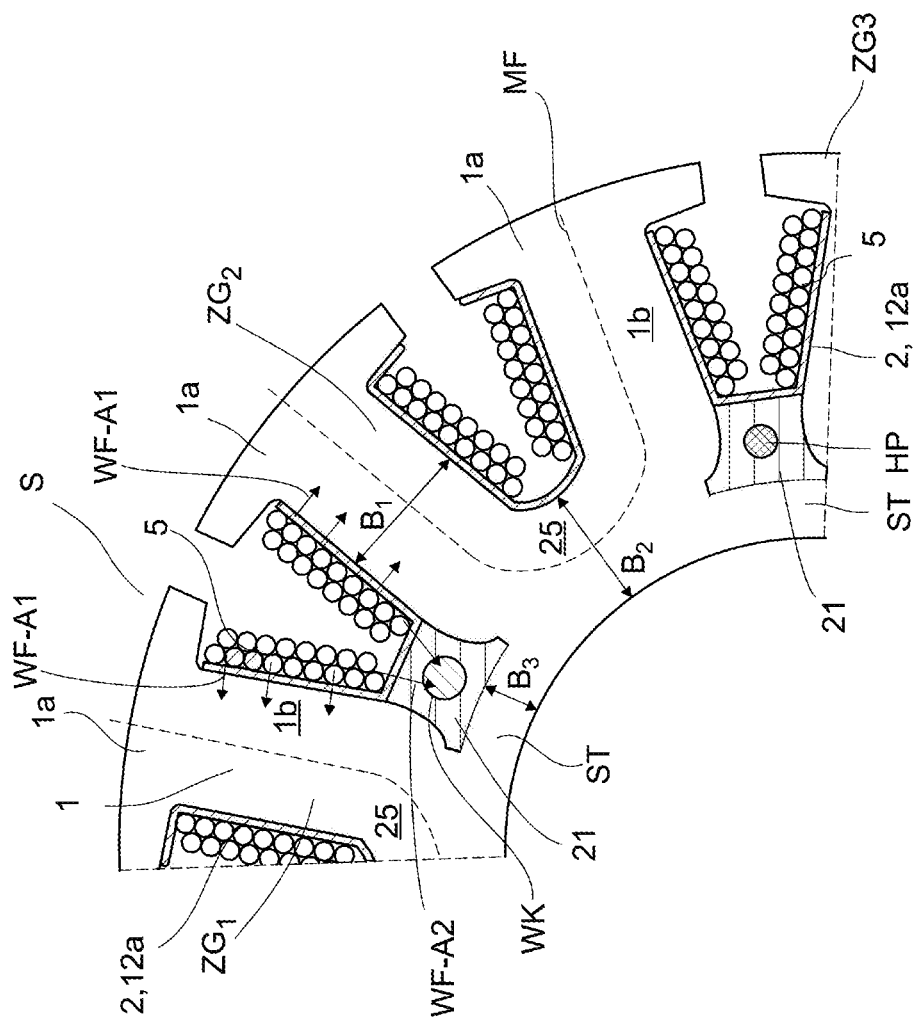

(51) Int. Cl.
    *H02K 3/30*     (2006.01)
    *H02K 3/34*     (2006.01)

(56) References Cited

U.S. PATENT DOCUMENTS

| | | |
|---|---|---|
| 2003/0141778 A1 | 7/2003 | Caamano |
| 2004/0021395 A1 | 2/2004 | Maslov et al. |
| 2011/0037338 A1 | 2/2011 | Leiber et al. |
| 2012/0001515 A1 | 1/2012 | Kudose et al. |
| 2012/0306297 A1 | 12/2012 | Kim et al. |
| 2012/0319526 A1 | 12/2012 | Hagenlocher et al. |
| 2018/0175705 A1 | 6/2018 | Festa et al. |

FOREIGN PATENT DOCUMENTS

| | | | | |
|---|---|---|---|---|
| DE | 10022071 A1 | 11/2001 | | |
| DE | 102009057446 A1 | 6/2011 | | |
| DE | 102016119822 A1 * | 4/2018 | ............... | B60K 6/24 |
| EP | 2179488 B1 * | 5/2012 | ............. | H02K 1/148 |
| EP | 2179488 B1 | 5/2012 | | |
| FR | 2711456 A1 | 4/1995 | | |
| JP | 2004072950 A * | 3/2004 | | |
| JP | 2004129396 A * | 4/2004 | | |
| JP | 2004312800 A * | 11/2004 | | |
| WO | 2003030333 A2 | 4/2003 | | |
| WO | WO-03030333 A2 * | 4/2003 | ............... | F03D 9/25 |
| WO | 2005071817 A1 | 8/2005 | | |
| WO | 2010099974 A2 | 9/2010 | | |
| WO | 2010099975 A2 | 9/2010 | | |

OTHER PUBLICATIONS

Int'l Search Report dated Jun. 21, 2019 in Int'l Application No. PCT/EP2019/051964.

GB Examination Report for the related U.K. Application No. 2013944.0 dated Feb. 18, 2022.

GB Examination Report for the related U.K. Application No. 2013944.0 dated Dec. 28, 2022.

First Office Action issued by the Chinese Patent Office for Application No. 201980012361.9, dated Jan. 6, 2022, 15 pages including English Translation.

Second Office Action issued by the Chinese Patent Office for Application No. 201980012361.9, dated Sep. 15, 2022, 25 pages including English Translation.

* cited by examiner

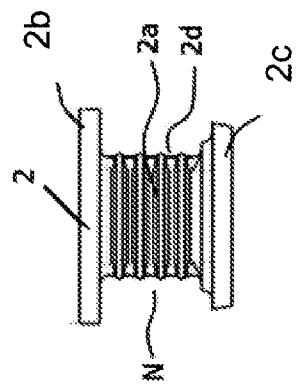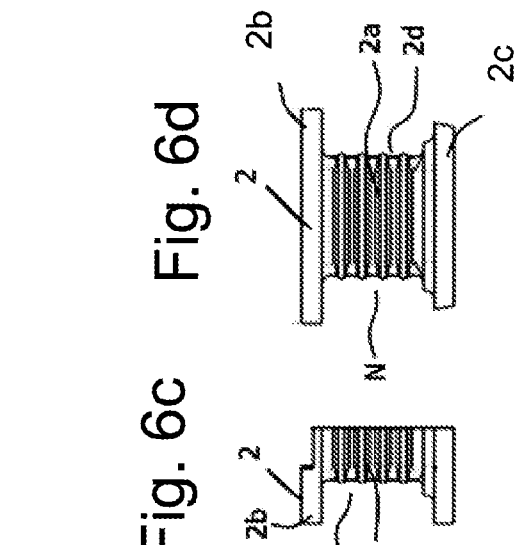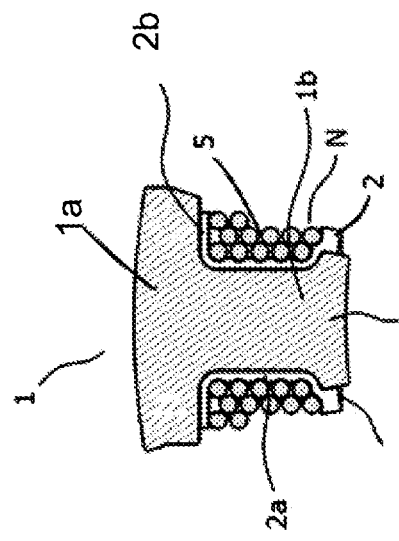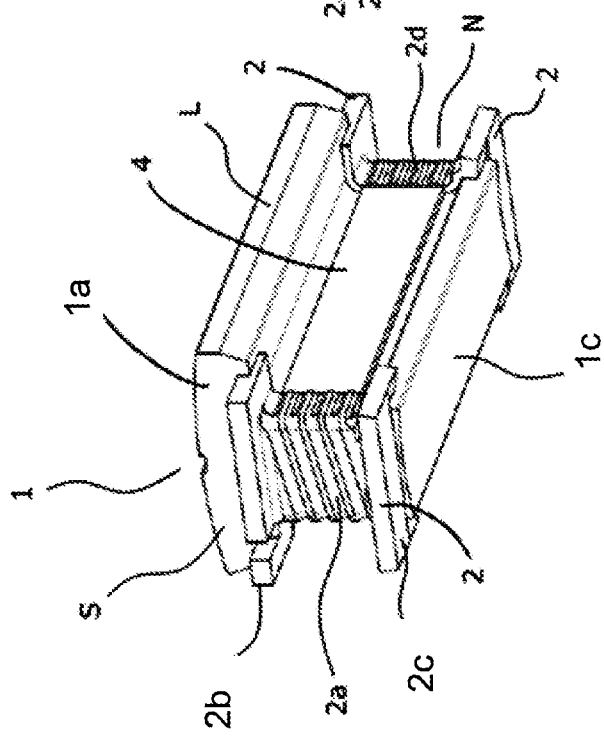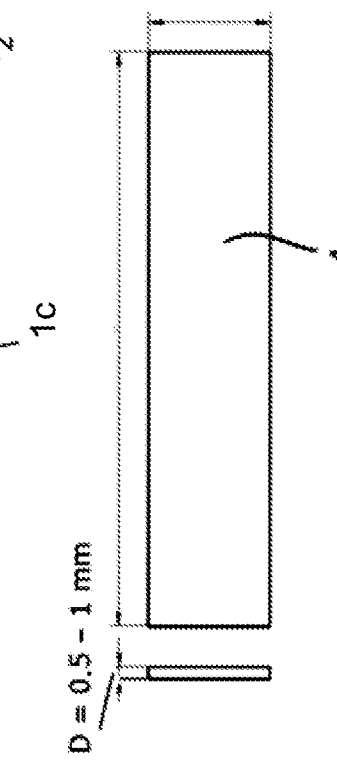

INTERNAL STATOR OF A ROTARY FIELD MACHINE HAVING STATOR TOOTH GROUPS EACH CONSISTING OF TWO DIRECTLY ADJACENT TEETH AND A MAGNETIC RETURN

CROSS-REFERENCE TO RELATED APPLICATION

This application is a Section 371 of International Application No. PCT/EP2019/051964, filed Jan. 28, 2019, which was published in the German language on Aug. 15, 2019 under International Publication No. WO 2019/154651 A1, which claims priority under 35 U.S.C. § 119(b) to German Patent Application No. 10 2018 102 754.0, filed Feb. 7, 2018, the disclosures of which are incorporated herein by reference.

The present invention relates to an internal stator of a rotating-field machine, which internal stator has a number of N stator teeth which together form a number of N/2 tooth groups, and each stator tooth has in each case one pole core and one pole shoe integrally formed thereon, wherein the pole cores are manufactured from a first material, and that in each case one tooth group is formed by two directly adjacently arranged stator teeth which, together with a magnetic return means, are constituent parts of a magnetic circuit.

PRIOR ART

Known rotating-field machines or electric motors are generally designed as permanently excited internal-rotor or external-rotor motors. These are increasingly used as electrical drive motors of two-wheeled vehicles, passenger motor vehicles, heavy goods vehicles, and in propeller-driven drive systems in the maritime sector and in aviation. In particular in the case of vehicles, ships and also more recently electric aircraft which are driven using batteries or lithium-ion batteries, efficiency is the primary design parameter, because the efficiency primarily determines the size of the battery and thus the overall costs. It is however also necessary for the costs of the electric motor to be taken into account in the overall consideration, for which reason cost-efficient use of a wide variety of materials is necessary and relevant. In the aviation sector, in particular in the case of electrically driven aircraft, not only the efficiency but also the power density must be taken into account, for which reason the use of permanent magnets is generally preferred.

In order to achieve high efficiency and power density, various measures for reducing losses are implemented in addition to the use of permanent magnets. A distinction is made between copper losses in the coils, the iron losses in all iron-containing motor components relevant to the magnetic circuit, and the friction losses in the bearings.

In order to reduce copper losses, the single-tooth technique and winding of single teeth or double teeth are favored. With the single-tooth winding technique, the exciter coil can be wound in a precise manner, whereby the copper filling level in electric motors is increased. In the case of external-rotor motors, aside from the single-tooth technique, use is also made of a winding technique with a flexural stator, as described in EP 2179488 B1.

In order to reduce iron losses, use is made of laminated stators with a small lamination thickness, in particular Si—Fe laminations with lamination thicknesses <=0.3 mm, and laminated rotors and optionally, in order to reduce the eddy current losses, also fragmented permanent magnets. Furthermore, use is increasingly made of materials with high temperature resistance, in particular permanent magnets with high remanence and at the same time high coercivity field strength $H_{CJ}$. This high temperature resistance leads to very high costs, because, for example, such permanent magnets have a high dysprosium fraction. Furthermore, stator laminations with very low losses (lamination thickness 0.1-0.2 mm) or high degree of saturation (for example cobalt-iron laminations) are very expensive.

However, the prior art has disclosed few approaches addressing how the power of the motor can be increased through highly efficient heat conduction for the purposes of increasing the heat dissipation of the motor.

For example, in WO 2010/099974, a double rotor with a highly complex water-type cooling arrangement is realized. The cooling channels are realized in an injection molding process using thermosetting plastic, and run between the exciter coils from the housing to the winding head, and are diverted at the winding head. Such cooling is extremely expensive and furthermore not optimal, because winding space for copper coils is lost.

Another approach for heat conduction is realized in WO2010/099975. In the case of this double-rotor motor, the stator is encapsulated by injection molding with a thermosetting plastic material with good heat conductivity characteristics. At the same time, in the selection of the thermosetting plastic material, importance must be attached to stiffness, because the encapsulation of the stator by injection molding substantially contributes to the stability of the cantilevered stator during operation. Furthermore, it is disclosed in WO2010/099975 that, by means of the potting and the good heat conductivity characteristics of the thermosetting plastic material, the heat transfer from the winding head of the exciter coils to the housing can be improved.

The solution disclosed in WO2010/099975 however has certain weaknesses. Firstly, in the case of injection molding using thermosetting plastic, consideration must be given primarily to the strength, and it is thus not possible, in the selection of the material, to attach importance exclusively to the heat conductivity characteristics. Furthermore, with a material with simultaneously high strength and high heat conductivity, the method is very expensive, because the entire stator obtains its final stability and heat conductivity for the first time in the injection molding process involving thermosetting plastic. The stator teeth must be fixed in a very solid manner during the injection molding process because high injection pressures are used in the case of injection molding involving thermosetting plastic. Furthermore, a high level of material use with very expensive fillers (heat conductors, for example boron nitride, strength-improving materials, such as for example carbon fibers or glass fibers) is necessary. Finally, the concept of the double-rotor motor, owing to the principle, allows heat conduction only in one direction.

Common methods of optimizing the insulator of the stator tooth with good heat conduction are the use of stator tooth end pieces composed of plastic and the insulation of the central region by means of a thin Kapton film with acceptable conductance (0.12-0.3 W/mK) and sufficient dielectric strength >2 kV. Owing to the thin-walled nature of the Kapton film, it is however possible for more heat to be transferred via this heat path. Owing to the thin film, the heat path from the exciter coil to the stator is reduced, and the copper filling ratio is increased, because the thin-walled Kapton film allows more space for the copper coils in the winding window. This insulation technique is however used primarily to improve the copper filling ratio of the electric motors. It does not result in improved cooling performance, because the coil normally does not bear against the Kapton film and thus a certain air gap is situated between the hot coil and the heat-dissipating Kapton film and the exciter coil, which arises owing to the lack of precision in the winding technique.

OBJECT OF THE INVENTION

It is an object of the invention, in the context of increasing the continuous power of rotating-field machines with an external rotor, to improve the heat dissipation from the coils via the stator tooth or internal stator and reduce the weight of the internal stator.

Said object is achieved according to the invention by means of an internal stator as per the preamble of claim 1 in that, between two adjacent stator teeth of two adjacent tooth groups, there is arranged in each case at least one intermediate element which extends in particular in an axial direction of the internal stator and which is manufactured from a second material, and in that differs from the first material of the pole cores.

By means of the intermediate elements according to the invention between the tooth groups, the weight of the stator is advantageously reduced, and the performance of the motor is improved through efficient heat dissipation inter alia via intermediate pieces between the tooth groups, such that the continuous power is advantageously considerably increased in relation to the prior art.

In this way, it is advantageously possible for regions of the internal stator which have no or minor importance for the magnetic flux to be utilized for heat conduction or for weight reduction through the use, in these regions, of materials which have good heat conductivity characteristics and/or a lower density than the material of the pole cores. Alternatively or in addition, it is possible, for example, for a fluid-type cooling arrangement or heatpipes to be arranged in these regions. Furthermore, in the case of the internal stator, intermediate pieces may be inserted in the region of the magnetic return, which intermediate pieces are ferromagnetic and, as an anisotropic material, are configured so as to be arranged with a preferred magnetic direction in the direction of the flux direction of the magnetic circuit.

The tooth groups each form, by way of their two stator teeth, U-shaped yokes with in each case at least one, preferably two, exciter coil(s) per tooth group. Arranged in each case between the tooth groups or the U-shaped yokes are the intermediate elements which are manufactured from a second material which has a density $\rho 2$ which is smaller, at least by a factor of two, than the density $\rho 1$ of the first material from which the pole cores are manufactured. With the intermediate element, it is possible for two different optimization directions to be pursued.

In a first optimization direction, it is sought to optimize the power or the maximum torque through improved heat conduction and a lower weight. Here, the second material may have a heat conductivity $\lambda 2$ higher than that of silicon iron (80 W/mK) of at least 150 W/mK (for example heat conductance of magnesium), in particular higher than 200 W/mK (heat conductance of aluminum). It is thus advantageously produced from aluminum or magnesium or an alloy of these materials.

Owing to the maximum limit of the operation of particular materials, such as for example copper coils, with a typical maximum temperature of 180° C., the maximum continuous power of an electric motor is limited by the temperature of the heat sink and by the temperature difference in the exciter coil. If the thermal conductance between coil and heat sink is halved, this leads to an increase in power by approximately a factor of 1.5-2. The efficient dissipation of heat is therefore of such particular importance.

Here, the heat is conducted primarily axially out of the stator, which is particularly important in the case of external-rotor motors. In order to optimize this heat conduction, the use of water-type cooling arrangements or heatpipes is expedient. It is thus possible, by means of water-type cooling arrangements or heatpipes, to further improve the axial heat conduction by a factor of 10 (water) to over a factor of 100 (heatpipes). In addition or alternatively, the water-type cooling arrangement/heatpipe cooling arrangement may be used in an inner ring which bears the internal stator (stator carrier).

In a second optimization direction, the focus is placed on minimizing weight. In this case, the second material has a density $\rho 2$ which is smaller, at least by a factor of three, preferably by a factor of 5, than the density $\rho 1$ of the first material, and/or has a heat conductivity $\lambda > 5$ W/mK. Corresponding materials would be aluminum oxide ceramics, aluminum nitride ceramics or silicon carbide or boron nitride. Also, the second material may be a non-ferromagnetic material. It is thus possible, as second material, to use a lightweight material, for example plastic, for the purposes of optimizing the weight of the stator.

The two stator teeth of a tooth group are advantageously connected via the magnetic return means in order to form the magnetic circuit. Here, in a first possible embodiment, the magnetic return means may be formed integrally on the ends, averted from the pole shoe, of the pole cores of the stator teeth belonging to one tooth group. Here, the two stator teeth and the magnetic return means may be formed by a U-shaped yoke.

In the context of a second possible embodiment, it is however likewise possible for the magnetic return means to be formed as a separate part and to be arranged between, and bear against, the pole cores of the stator teeth belonging to one tooth group. Here, the stator teeth are fastened to or formed integrally on, or lie in or against, an inner ring, wherein a magnetic return or partial return together with the magnetic return means is likewise possible via the inner ring. In this case, the inner ring should be manufactured from a ferromagnetic material. The inner ring may however also serve only for the fastening or mounting of the stator teeth.

In a further possible embodiment, the adjacent tooth groups are connected to one another via webs which are composed of the same material as the pole cores and are manufactured integrally therewith, wherein the cross-sectional area of the webs in a magnetic flux direction is smaller than the cross-sectional area in a magnetic flux direction of the magnetic return means. In the case of this embodiment, it is thus the case that all stator teeth of the stator are connected to one another via a ferromagnetic material, but the cross-sectional area of the ferromagnetic material is intentionally reduced between the stator teeth of two adjacent tooth groups in order to form the webs, whereby space is created here for the intermediate elements composed of a different material, which serve for weight reduction and/or cooling of the stator. Here, the intermediate elements lie between the pole cores of the adjacent stator teeth and against these, such that heat transfer from the stator tooth to the intermediate element occurs over as large an area as possible.

As already mentioned above, the stator teeth may, by way of their ends, averted from the pole shoes, of the pole cores, be fastened in non-positively locking fashion, by means of a connection which is positively locking in a radial and circumferential direction, in particular in the form of a dovetail guide, or fastened by means of wedge elements, to a connecting element which is in particular in the form of a ring.

For all possible embodiments described, it is the case that, in and/or on the intermediate element, there may be arranged at least one heat-conducting means, in particular in the form of a water channel of a water-type cooling arrangement or heatpipe, which heat-conducting means extends in an axial direction of the stator and serves inter alia for the dissipation of heat in an axial direction. Here, said heat-conducting means may be provided in each or else only in some intermediate elements.

For the radial dissipation of heat radially inward from the exciter coil to the heat-dissipating intermediate element, an insulating radial heat conductor which extends in an axial direction of the stator and which has a heat conductivity of greater than 2 W/mK, preferably >5 W/mK, may be provided, which is arranged between exciter coil and stator tooth. This radial heat conductor is either part of the insulator of the U-shaped tooth groups, or is preferably configured as a molded piece which is adapted to the coil winding geometry of the adjacent exciter coils and which is thus in contact with the coils over a large area. In this embodiment, materials which have good heat conductivity and which are at the same time electrically insulating, such as boron nitride, silicon carbide or aluminum oxide, with a conductivity of 10 up to 200 W/mK, are preferred, because the distance from the coil to the intermediate element is >2 mm (that is to say a path which is longer by a factor of 4 than the conventional insulation path from the exciter coil to the tooth core $1b$), and the radial cooling can be utilized effectively only if a corresponding material is used.

The intermediate elements may also serve for the fastening of the tooth groups or of the individual stator teeth to an inner ring. Here, the tooth groups or the stator teeth may engage radially into recesses of the inner ring, wherein the intermediate elements are of wedge-shaped form. If the intermediate elements themselves are held in position for example by means of the exciter coils and/or a potting compound, the stator teeth are also fixedly connected to the inner ring owing to the wedge shape.

It is however self-evidently also possible for a stator tooth or the tooth groups to be fastened to the inner ring by means of a positively locking connection, in particular a dovetail guide, wherein the stator teeth must then be pushed axially onto the inner ring.

If the space between the windings in the winding grooves is potted with an additional potting compound, this should advantageously have a heat conductivity of at least 0.25 W/mK, and there should no longer be any air inclusions between the coil wires of the windings. In this way, the heat dissipation is significantly improved.

In all of the embodiments described, the pole shoe of a stator tooth may be formed integrally on or fastened to the pole core. If pole shoe and pole core are formed in two parts, either the pole shoe may engage into an end-side recess of the pole core, or vice versa, wherein, for the permanent connection, the pole shoe may be for example pressed or adhesively bonded into the recess by way of a corresponding projection or web formed integrally on said pole shoe.

To produce a stator formed in this way, a production method is likewise claimed, in which, firstly, the exciter coils are wound, and these are then pushed onto the pole cores from the outside, following which, in a further method step, the pole shoes are fastened to the pole cores.

Preferably, neighbouring coils of a tooth group are, for the purposes of optimizing the copper filling ratio, formed with different geometrical shapes, for example wedge-shaped versus parallel winding forms, or as exciter coils with n layers and (n+x) layers. Here, the coils are, in accordance with the geometrical winding form, pushed successively onto the one stator without pole shoes, wherein, firstly, the exciter coils with (n+x) layers are pushed onto every second stator tooth $1b$, and then the exciter coils with (n) layers are pushed onto every second adjacent yoke tooth, such that no contact is made with the exciter coils during the pushing-on process. Furthermore, the stator tooth $1b$ is already provided with an insulation prior to the pushing-on process, as discussed in FIGS. 4 to 7. Thus, each tooth group $ZG_i$ has in each case 2 teeth with in each case different coils with n and n+x layers respectively. In order to prevent compensation currents, these coils are furthermore preferably connected electrically in series with one another. Alternatively, the coil may also be wound onto a winding body and pushed with the winding body onto the tooth.

It is likewise possible for the pole shoe to be fastened to the pole core by means of a positively locking connection, in particular by means of a groove, for example a dovetail guide, wherein, for this purpose, said pole shoe can be pushed onto the pole core in an axial direction.

The internal stator according to the invention may also be completely encapsulated by injection molding with a material composed of thermoplastic or thermosetting plastic, which has a heat conductivity of $\lambda>1$, preferably $\lambda>2.5$ W/mK. This likewise yields a very good dissipation of heat.

The above embodiments with optimized axial stator cooling can be used particularly effectively in the optimization of an external-rotor motor with integrated electronics, wherein cooling of the winding head of the exciter coils is also an expedient addition.

The winding head cooling is realized by virtue of the exciter coils having only a small spacing to a radially extending housing part/cooling body, and the stator being potted between cooling body and stator. The external-rotor motor is thus cooled via multiple parallel paths with very good heat conduction (stator carrier, intermediate elements, winding head). In the case of a configuration with very high power losses, a water channel is additionally integrated in the cooling body, which water channel dissipates high power losses and is expediently connected to stator carrier and/or intermediate element.

In the case of a water channel being used in the cooling body, it is additionally possible for the power semiconductor of an ECU, which is arranged axially, to be jointly cooled. This yields an extremely compact, high-powered power pack (electric motor with integrated electronics).

In all of the embodiments described above, it is possible for the stator to furthermore be designed such that the stator teeth, in particular the pole cores thereof, are entirely or regionally covered or encased by an electrical insulator which serves for electrical insulation of the winding with respect to the stator tooth, wherein the electrical insulator may be of single-part or multi-part form, and at least one part or region of the insulator, or the entire insulator, is formed from a material with a heat conductivity characteristic of greater than 1 W/mK, preferably greater than 2.5 W/mK. Here, the electrical insulator may have two insulating bodies which engage around in each case one end side of the stator tooth and which, in particular at their side facing toward the winding of the exciter coil, have channels for the coil wires of the winding. It is likewise possible that at least one, in particular fixed and dimensionally stable heat-conducting element, in particular in the form of a plate, bears against at least one longitudinal side of the pole core and/or of the pole shoe, which heat-conducting element is arranged between two insulating bodies which engage around in each case one end side, in particular in recesses of the insulating bodies, wherein at least one heat-conducting element has a heat conductivity of greater than 5 W/mK, preferably greater than 10 W/mK, particularly preferably greater than 20 W/mK, in particular is manufactured on the basis of ceramic or silicon carbide or from boron nitride composite materials, and/or the heat-conducting element has a heat conductivity which is greater at least by a factor of two, preferably by a factor of five, than that of the insulating bodies.

It is also possible for the heat-conducting element to bear directly against a part or the entirety of the side surface of the pole core and to be manufactured from ceramic or on the basis of ceramic and to have both electrically insulating characteristics and a thermal conductivity of >10 W/mK, particularly preferably to be an aluminum oxide or nitride ceramic or to be composed of silicon carbide or boron nitride. Here, it is likewise possible for the electrical insulator or at least one insulating body to be formed by encapsulation of the stator tooth by injection molding, in particular by encapsulation at least of the pole core by injection molding, wherein the potting material is a thermoplastic or a thermosetting plastic, wherein the thermosetting plastic has in particular a heat conductivity of greater than 1 W/mK, preferably greater than 5 W/mK. Here, the electrical insulator (200) formed by encapsulation by injection molding may have at least one window-like aperture or a recess with thin-walled region for receiving at least one heat-conducting element in particular in positively locking fashion, wherein the heat-conducting element is arranged laterally on the pole core, in particular bears against the latter, and has a heat conductivity of greater than 5 W/mK, in particular is manufactured from boron nitride.

In all of the possible embodiments described above, it is advantageous if the magnetic resistance between the pole cores of two stator teeth belonging to one tooth group is lower than that between the pole cores of two adjacent stator teeth belonging to different tooth groups.

Possible embodiments of the stator according to the invention will be discussed in more detail below on the basis of drawings.

Figure 2:
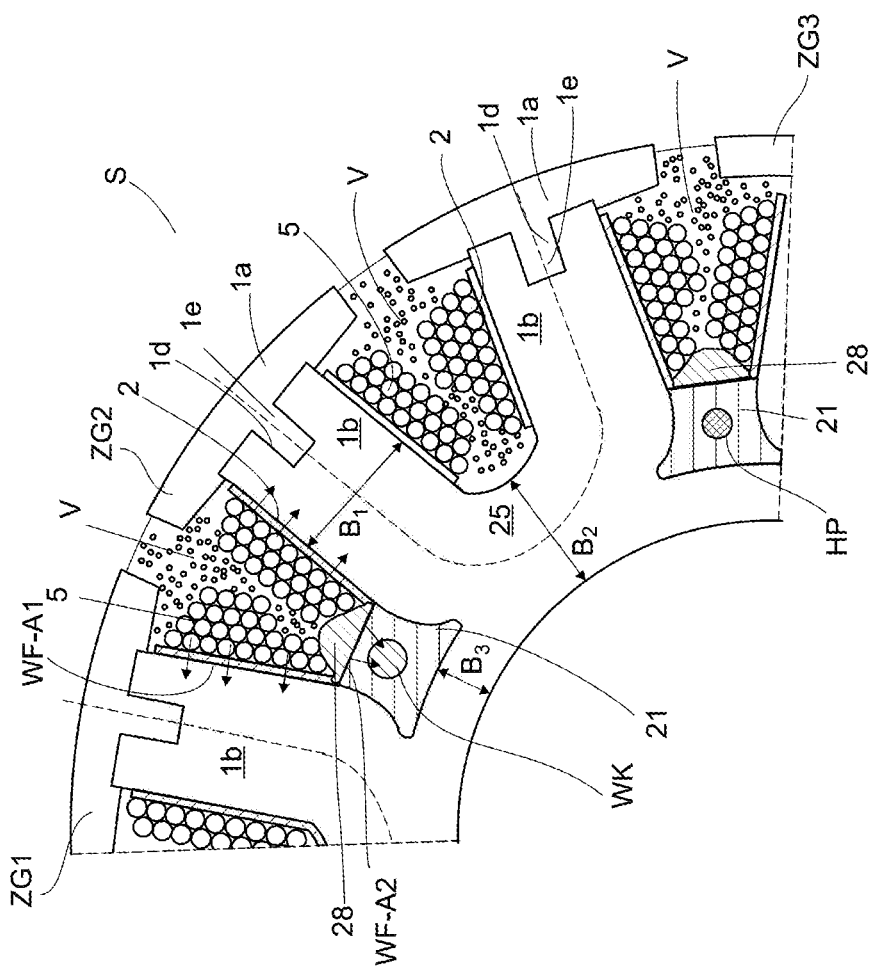
Figure 3:
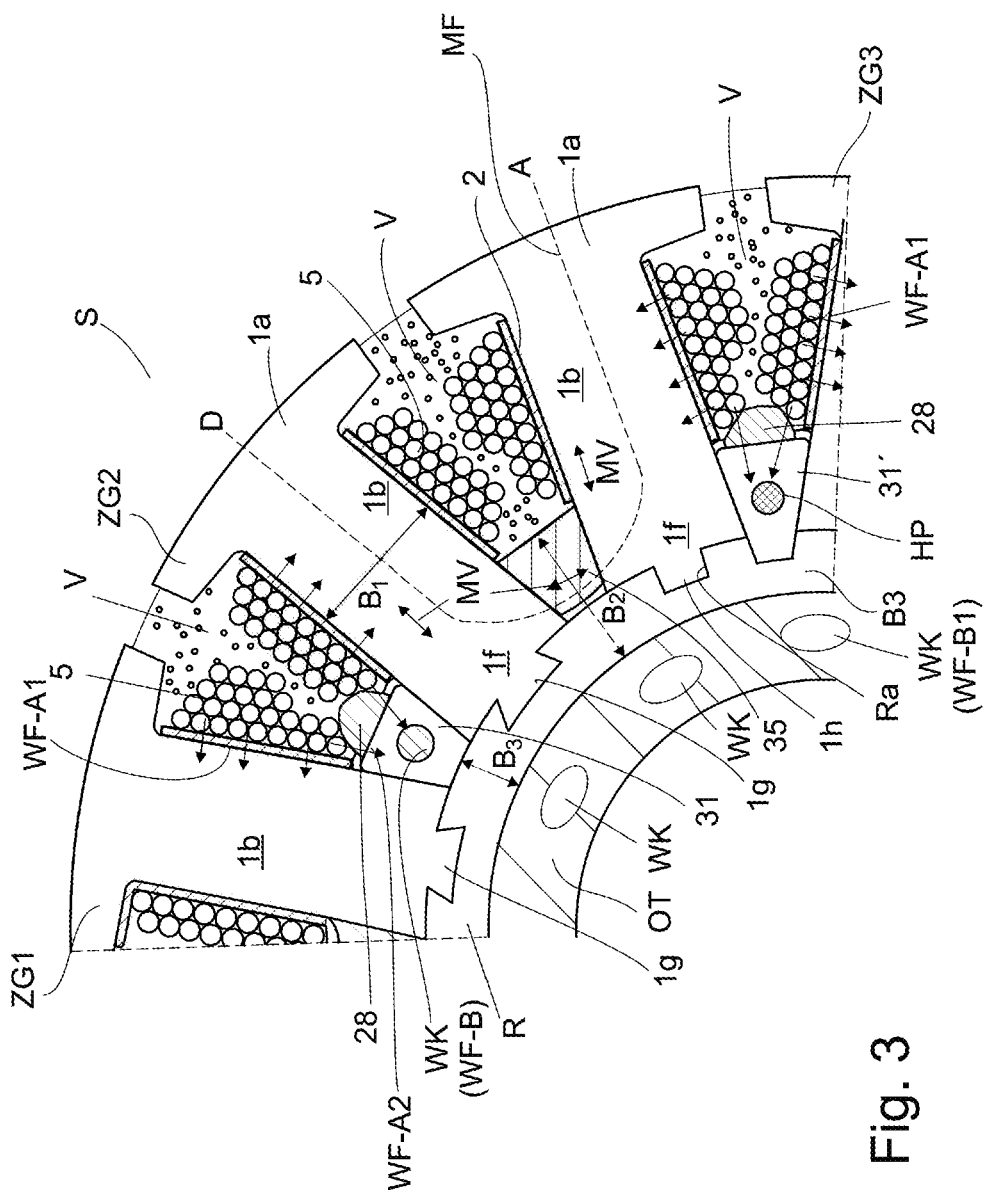
Figure 4:
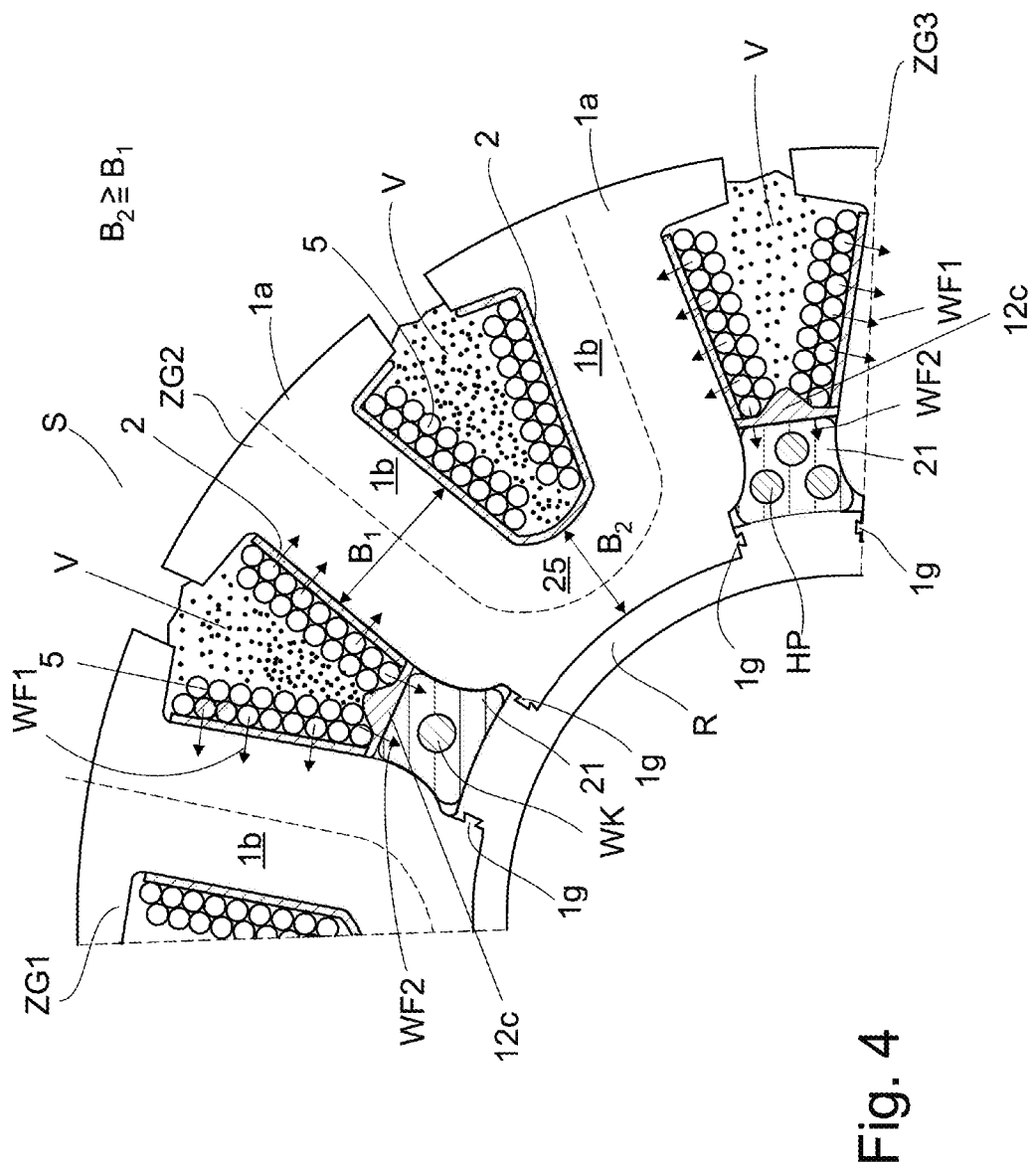
Figure 5:
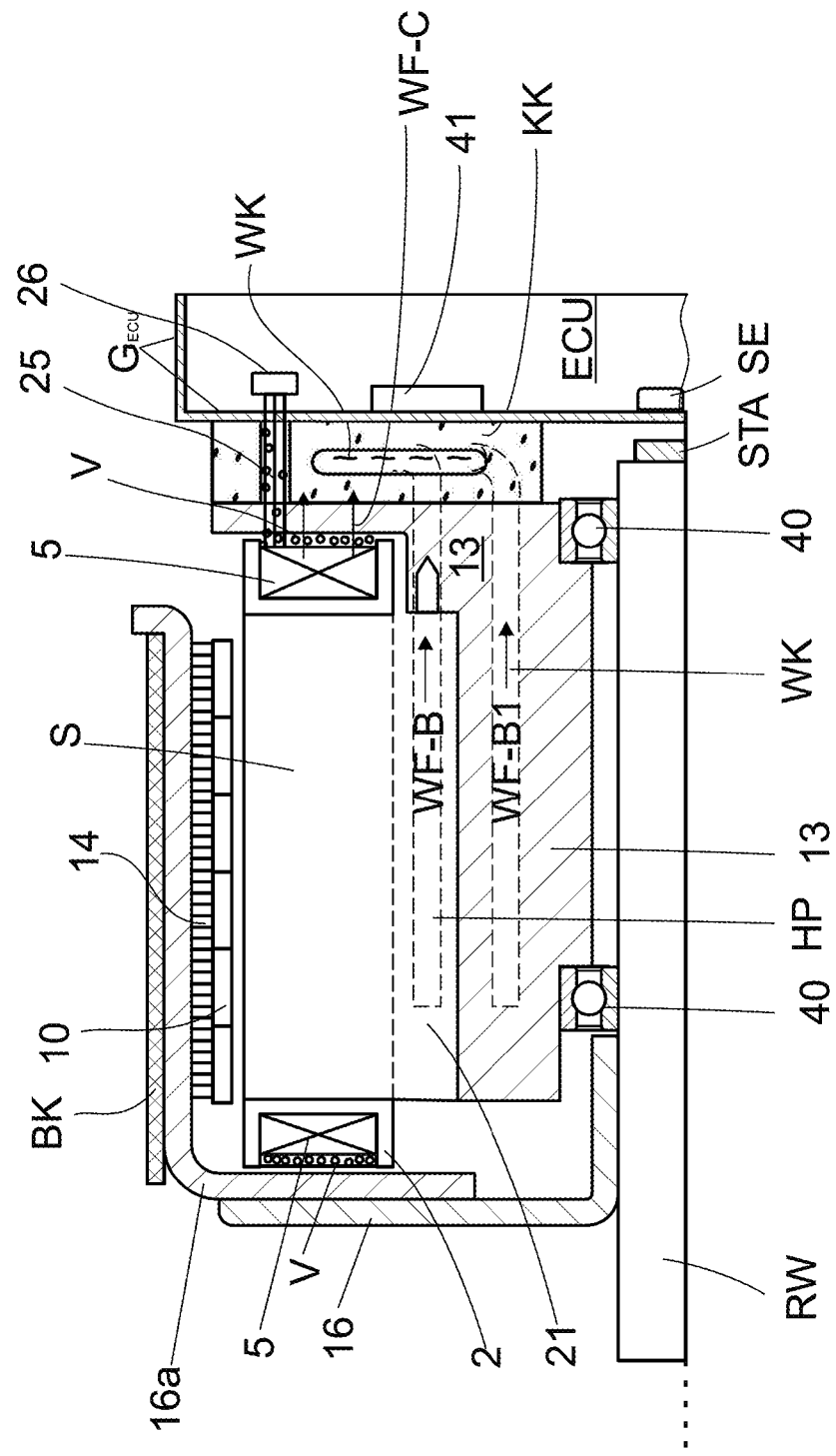
Figure 9:
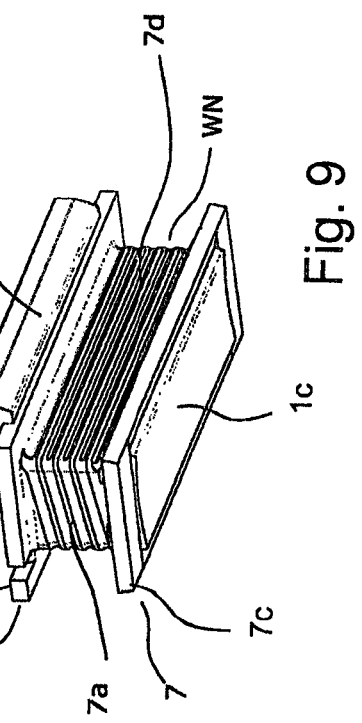
Figure 7:
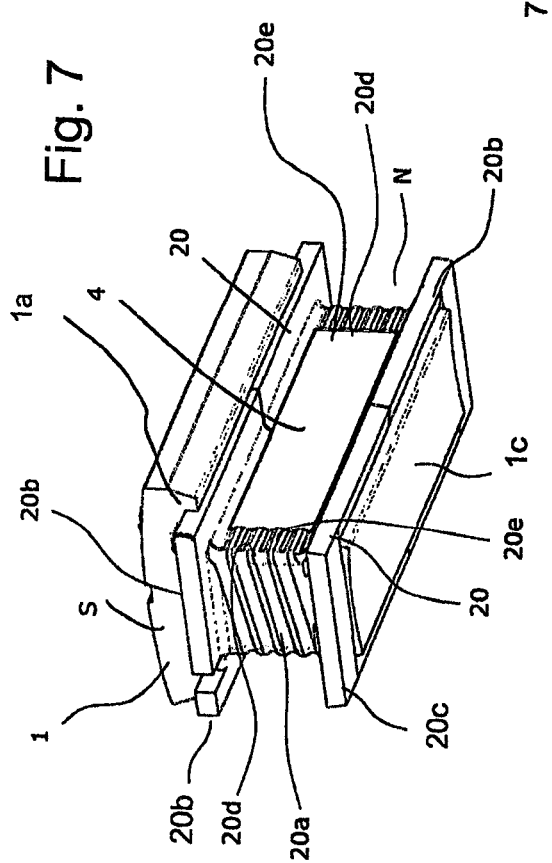
Figure 8:
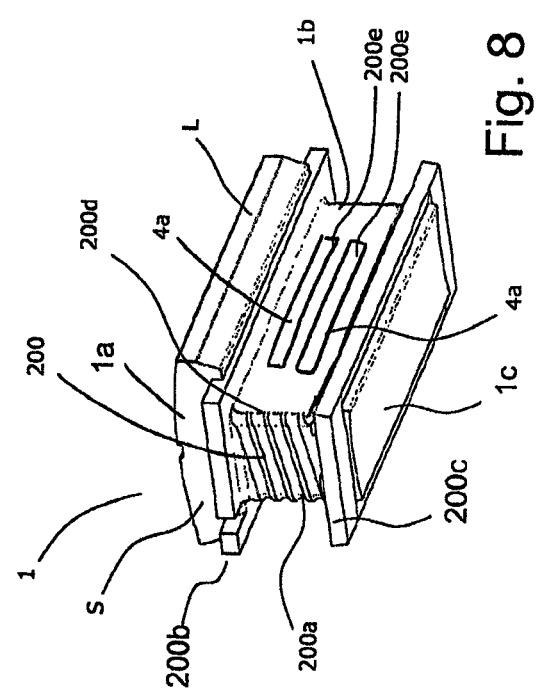
Figure 10:
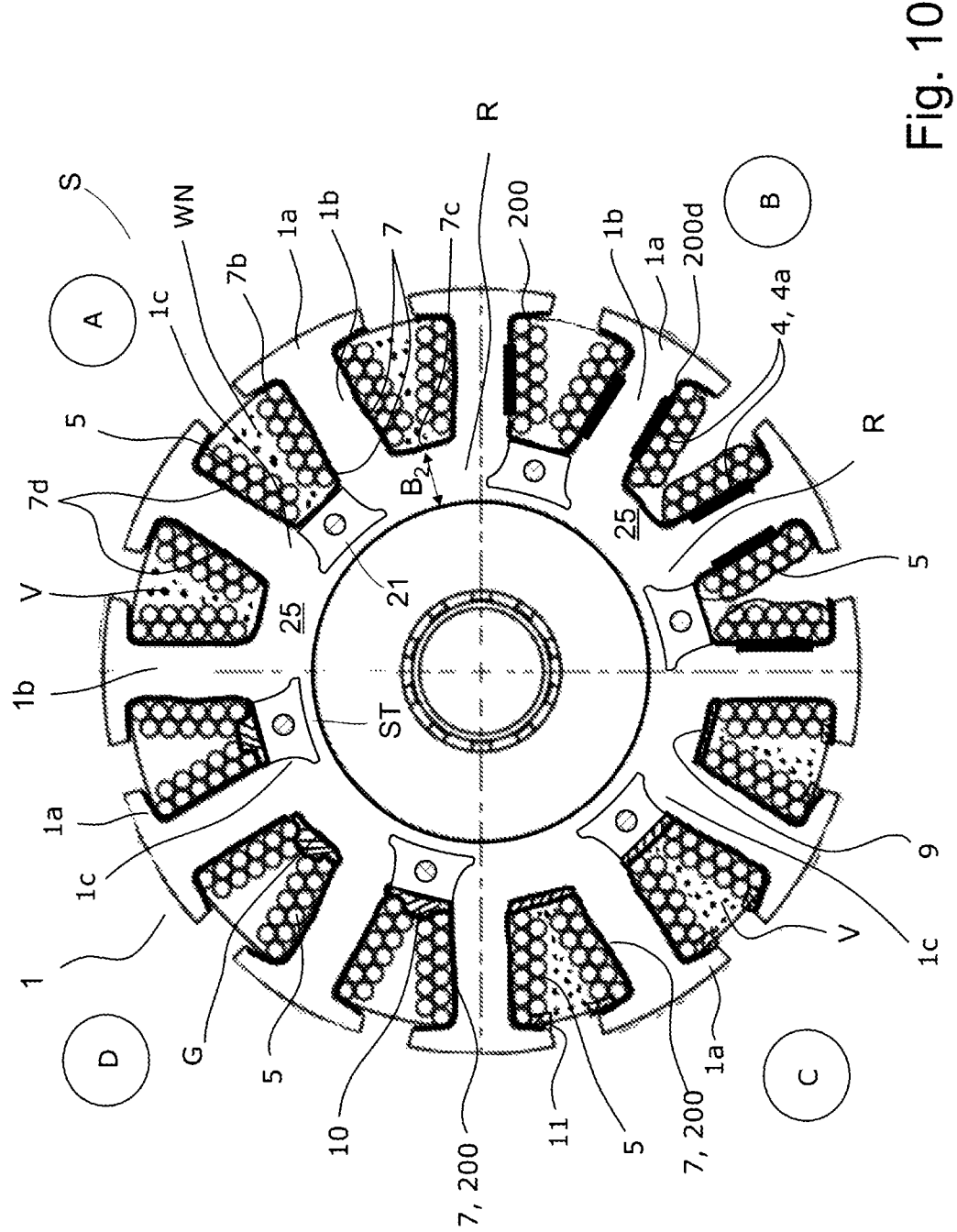

In the drawings:

FIG. 1: shows a part of the cross section through a first possible embodiment of an internal stator according to the invention with tooth groups connected by means of webs;

FIG. 2: shows a possible modification of the internal stator as per FIG. 1 with separately manufactured pole shoes, which internal stator has been potted with a potting compound;

FIG. 3: shows a further possible configuration of an internal stator with inner ring and stator teeth fastened thereto;

FIG. 4: shows a further possible embodiment, wherein the stator teeth of a tooth group are formed in one piece and form a U-shaped yoke, wherein the yoke is fastened by means of dovetail guides to an inner ring;

FIG. 5: shows a longitudinal section through a rotating-field machine according to the invention with multiple possible cooling paths;

FIG. 6a: shows a perspective illustration of a stator tooth according to the invention with two end-side insulating bodies and a heat-conducting element arranged axially in between;

FIG. 6b: shows a cross-sectional illustration through the stator tooth as per FIG. 2a in the region of an insulating body;

FIGS. 6c and 6d: show side views of the insulating body;

FIG. 6e: shows a side view and cross-sectional illustration through a heat-conducting element;

FIG. 7: shows a stator tooth as in FIG. 7b, wherein the end-side insulating bodies however cover the entire axial length of the stator tooth with as small a parting gap as possible and together form in each case one window-like recess for receiving a heat-conducting element at at least one pole core longitudinal side;

FIG. 8: shows a stator tooth according to the invention with an insulator formed by encapsulation by injection molding, which insulator forms, at each pole core longitudinal side, two recesses for receiving in each case one heat-conducting element;

FIG. 9: shows a stator tooth according to the invention with an insulator formed by encapsulation by injection molding from a thermosetting plastic with a material with good thermal conductivity;

FIG. 10: shows possible embodiments of an internal stator, wherein one possible embodiment of an internal stator is illustrated in each case in a quadrant A to D.

FIG. 1 shows a part of the cross section through an internal stator S according to the invention of an external-rotor motor according to one possible embodiment, wherein the heat flow directions WF-A1, WF-A2 are indicated by means of arrows.

In the case of the internal stator S, in each case two adjacent stator teeth 1 form in each case one tooth group $ZG_i$. Here, a tooth group $ZG_i$ forms a substantially U-shaped yoke. Here, the tooth groups $ZG_i$ are connected to one another by means of webs ST extending in an axial direction AX.

The intermediate elements 21 have the task of increasing the cooling power and are thus advantageously composed of a material with good thermal conductance. If the intermediate element 21 is composed of an electrically conductive material, it must also be separately insulated in relation to the coil 5, which may be realized for example by means of insulation material, insulators and/or additional heat-conducting elements, as illustrated and described in FIGS. 5, 7a-e and 8-10. By means of the intermediate elements 21, it is furthermore possible for the weight of the internal stator S to be reduced. It is also possible for the heat conduction to occur directly from the coil 5 to the intermediate element 21 if an additional element with good thermal conductivity is arranged between exciter coil 5 and pole core 1b. An advantage of this intermediate element 21 is that, here, a material can be used which has much more favorable thermal conductance than the stator lamination situated there in the standard case. Further parallel heat paths WF-A1 and WF-A2 are thus realized instead of only from the coil 5 to the stator tooth 1 and from there to the housing of the rotating-field machine.

Here, each stator tooth 1 is composed of the pole core 1b and the integrally formed pole shoe 1a, wherein the stator teeth 1 of a tooth group $ZG_i$ are connected to one another by the magnetic return means 25. Here, the stator teeth 1 of a tooth group may be formed by U-shaped stator laminations. The coils 5 are electrically insulated from the stator teeth 1 by means of a suitable insulator 2, 12a, wherein the insulator 2 or the heat-conducting means 12a can serve for the dissipation of heat from the coils in the direction WF-A1 of the stator tooth 1. The insulation and heat conduction will be described and illustrated separately on the basis of FIGS. 5, 7a-e and 8-10.

The stator teeth 1 and the magnetic returns 25 are manufactured from a first, in particular ferromagnetic material MA1. The intermediate elements 21 are manufactured from a second, different material MA2, which is in particular lighter and has better conductance than the first material MA1. The stator teeth of a tooth group form, together with their magnetic return element 25, a U-shaped yoke, which forms a part of the magnetic circuit MF. The region 25 which connects the stator teeth 1 of a tooth group $ZG_i$ to one another forms the magnetic return and has a radial width $B_2$ which corresponds to the width $B_1$ of the pole cores 1b. The radial width $B_3$ of the webs ST is significantly smaller than the width $B_2$, wherein the region thus freed up between web ST and exciter coil 5 is utilized for the intermediate element 21. The widths $B_1$ and B2 are equal if a non-anisotropic material is used. B2 is greater than B1 if an anisotropic material with preferred magnetic direction is used in the pole core 1b.

The external rotor (not illustrated) may for example be equipped with permanent magnets.

Either a water-type cooling circuit WK may be integrated into the intermediate elements 21, and/or heatpipes HP may be arranged in or on the intermediate elements 21, which water-type cooling circuit or heatpipes extend in an axial direction and are connected to a heat exchanger or cooling body respectively, which may be arranged for example axially adjacent to the internal stator S. The heatpipes HP may also be formed by molded elements with very good heat conductivity, for example copper or ceramic pins, by means of which the heat-conducting characteristics can be further improved in relation to the non-ferromagnetic basic material of the intermediate elements. The axial heat conduction in particular is optimized by means of said pins, which is of particular importance in the configuration of an external-rotor motor for the dissipation of heat.

Alternatively, use may also be made of a heatpipe in the form of a classic heatpipe with a hermetically encapsulated volume which is filled with a working medium (for example water or ammonia). By means of heatpipes, the heat dissipation can be improved yet further by a factor of more than 100, in particular a factor of 1000, than in the case of solid pins, such as for example copper, being used.

In the embodiment illustrated in FIG. 2, by contrast to the embodiment illustrated and described in FIG. 1, the pole shoes 1a which are required for a sinusoidal configuration of the magnetic flux are manufactured separately and, after the pole cores 1b have been equipped with the exciter coils 5, are mounted onto the stator core 1b. It is thus possible for individual coils 5 with corresponding optimized layer configuration to be pre-wound with an ideal winding technique. Here, it is even possible for coils with more than two coil layers to be provided in a dimensionally accurate manner. These may be realized on coil carriers 2, which are then pushed on radially, or in the form of exciter coils 5 without winding bodies, which are mounted onto the stator core 1b that has previously been encapsulated by injection molding or insulated. After the equipping process, the pole shoes 1a are pressed on or adhesively bonded on. If the stator, after being wound, is potted (potting compound V), no particularly high demands are placed on the press-fit connection or adhesive connection, because the pole shoe 1a is stabilized as a result of the potting process.

This embodiment is therefore expedient for optimizing the copper filling ratio in that the coils can, in accordance with the winding form, be pushed successively onto the one stator without pole shoes, wherein, firstly, the exciter coils with (n+x) layers, or a wedge shape adapted to the winding geometry, are pushed onto every second stator core 1b, and then the exciter coils with (n) layers are pushed onto every second adjacent yoke tooth, such that no contact is made with the exciter coils during the pushing-on process. Furthermore, the stator core 1b is already provided with an insulator prior to the pushing-on process, as discussed in FIGS. 4 to 7. Alternatively, the coil may also be wound onto a winding body and pushed with the winding body onto the tooth.

In this embodiment, the U-shaped yokes 1b, 25 are formed in one piece with the webs ST which connect the individual tooth groups $ZG_i$ to one another. The same conditions for $B_1$, $B_2$ and $B_3$ as described in FIG. 1 apply here also.

FIG. 3 shows a further possible embodiment of the multi-part internal stator S. In this embodiment, the individual stator teeth 1 are arranged with their ends 1f on an inner stator ring R, or are connected for example by means of a dovetail guide 1g. In this embodiment, too, in each case two adjacently arranged stator teeth form in each case one tooth group $ZG_i$. Here, between the stator teeth of a tooth group $ZG_i$, there is arranged in each case one magnetic return means 35, by which the magnetic circuit MF of the respective tooth group is closed. If the stator inner ring R is manufactured from a ferromagnetic material, a part of the magnetic flux can also flow via the stator inner ring R. Preferably, the magnetic return means 35 may be a laminated core with an anisotropic preferred direction in a flux direction. Preferably, the widths $B_1$ and $B_2$ should then be equal.

The water-type cooling arrangement WK or heatpipe HP arranged in the intermediate elements 31, 31' runs in an axial direction through the internal stator S and forms the heat path WF-B.

Between the U-shaped yokes, which form in each case one tooth group $ZG_i$, there is in turn arranged an intermediate element 31, 31', which serves as heat-conducting element. This embodiment offers the possibility, by contrast to the embodiment of FIGS. 1 and 2, of insulating and winding the individual teeth 1 in advance. Here, the stator insulation technique with heat-conducting characteristics of the embodiments of FIG. 7a to FIG. 10 may be implemented, and the exciter coils may be implemented with a maximum filling ratio with optionally uneven winding of the neighboring teeth. The number of windings of adjacent teeth preferably differs for the purposes of optimizing the filling ratio, but necessitates that the adjacent teeth are interconnected in series. It is thus possible for the coils to be wound differently with the same round copper wire, for example one coil with 3 layers and the adjacent coil with 4 layers, or with different geometrical forms.

The stator inner ring R may be formed as a laminated core or as a heat conductor. If it is formed as a ferromagnetic conductor, this can serve for the optimization of the thickness $B_2$ or the configuration of the magnetic return means 35. Also, an adaptation of the contour in the region of the heat-conducting element 31 is possible, because this region contributes only little to the heat conduction.

It is in particular also possible for the stator cores 1b to merely be inserted with a projection 1h into a radial recess Ra of the stator inner ring R. In this case, the intermediate elements 31 are of wedge-shaped form and are held in position in a radial direction by the coils 5, the filler material F, etc. By means of the wedge shape, in turn, the stator teeth 1 are held fixedly on the stator inner ring R.

Optionally, in the case of the internal stator S illustrated in FIG. 3, an additional inner ring OT may be provided, which, in the context of improved axial heat conduction, is preferably produced from aluminum, provides the internal stator with even greater stability, and may optionally also have channels for a water-type cooling arrangement WK, wherein the channels for the water-type cooling arrangement WK extend in an axial direction through the internal stator S and form a heat path WF-B1, via which the heat is dissipated in an axial direction.

For the above-described embodiments, it is the case that the width $B_1$ of the stator tooth 1 and the thickness $B_2$ of the magnetic returns 25, 35 must be dimensioned such that the magnetic flux is not impeded. For the flux guidance, use may be made of anisotropic material with different preferred magnetic direction. If the U-shaped yokes 1b, 25 are connected at the inside to a ring R, said ring R or inner region may also make a small contribution to the magnetic flux, but primarily has the purpose of increasing the stability of the internal stator S and may be of very thin-walled form, such that $B_3$ may for example also be configured to be less than <3 mm. This is self-evidently dependent in each case on the size of the rotating-field machine. The lower limit of the thickness $B_3$ is determined by an economical manufacturing method and by stiffness requirements. If the stator S is potted, the requirements on strength are low, such that the thickness $B_3$ can be minimized. As already stated, it is then expediently possible for intermediate elements 21, 31, 31' as heat-flow-guiding elements with integrated heatpipes HP or water-type cooling circuits WK or pins or materials with very high thermal conductivity, for example copper or ceramic pins or molded elements, carbon nanotubes etc., which extend in an axial direction of the stator S, to be provided in the area that is freed up. As already described, these intermediate elements can be used for efficient axial cooling in a weight-optimized manner. These intermediate elements 21, 31, 31' are furthermore arranged in a region which cannot be utilized for the copper coils, and thus contribute to a thermal optimization of the stator.

The described construction of the internal stator S may, before the winding with the exciter coils 5, be equipped in advance with an insulator 2 for the exciter coils 5, wherein, for the insulator 2, it is expedient to use in particular an injection molding process with thermoplastic or thermosetting plastic. In the case of such a process, the intermediate elements 21 may be placed in already prior to the injection molding process, whereby it is possible to realize an optimum thermal transition between stator/coil and intermediate element 21, 31 in the most straightforward manner possible. It is also possible for additional heat-conducting elements 28 to be arranged between intermediate element 21, 31 and exciter coil 5.

FIG. 4 shows a further possible embodiment of an internal stator S according to the invention, in the case of which the U-shaped yokes, which are formed by the stator teeth 1 and the magnetic returns 25 that connect these to one another, are fastened by means of dovetail guides 1g to the inner ring R or are pushed onto the ring R into the corresponding recesses thereof in an axial direction in relation thereto. It is illustrated here by way of example that it is also possible for more than one heatpipe HP to be arranged in an intermediate element 21, whereby the heat dissipation in an axial direction can be considerably increased.

FIG. 5 shows a longitudinal section through a rotating-field machine according to the invention with multiple possible cooling paths WF-B, WF-B1 and WF-C. The cooling path WF-B is formed by a water-type cooling arrangement WK or a heatpipe and is arranged in an intermediate element 21, 31, 31' as illustrated and described in FIGS. 1 to 4. The heat path WF-B1 may be formed by a water-type cooling arrangement WK which extends through the inner ring R,OT of the internal stator S, as illustrated in FIG. 4. Arranged between the ECU and the internal stator S is a cooling body or heat exchanger KK which releases the heat dissipated via the water-type cooling arrangement or heatpipe to the surroundings or heat sink. A further cooling or heat dissipation path WF-C arises as a result of the bearing of the potting compound V at the end side against the stator carrier 13, which likewise bears against the cooling body KK over a large area. The pot-shaped rotor 16, 16a is produced preferably in a deep-drawing process and is fastened to the shaft RW, which in turn is supported via the bearing 40 on the stator carrier 13. The rotor part 16 is preferably designed to be thicker than the rotor 16a which bears the permanent magnets. That rotor part 16a which bears the permanent magnets is of thin-walled design and is flowed through to a significantly lesser extent by the magnetic flux than the laminated core 14 which is used (that is to say the flux density in the rotor 16a is at least 25%, preferably 50%, lower than in the laminated core 14), whereby the iron losses are minimized and a ferromagnetic material, which is typically used in an economical deep-drawing process, can be used. The rotor has a laminated external stator 14 and permanent magnets 10 arranged thereon, and also a bandage composed of glass or carbon fibers BK, whereby the rotor is made stiffer and can be operated even at very high rotational speeds. On the end side of the rotor shaft RW, there is arranged a sensor target STA, the rotation of which is detected by a sensor SE which is arranged in the housing of the ECU. The power electronics 41 are arranged on the housing wall of the ECU such that the heat thereof is dissipated directly to the cooling body KK. Via the connector 26 and the line 25, the exciter coils 5 are connected to the ECU.

FIG. 6a shows a possible embodiment of a stator tooth 1 according to the invention illustrated in perspective view, wherein the conventionally used insulating film, which is typically manufactured from Kapton, has been replaced by a heat-conducting element 4 in the form of a plate. The heat-conducting element 4 has much higher thermal conductivity, and a high electrical dielectric strength. It may be manufactured from a material such as, for example, ceramic or ceramic-based material. It is thus advantageously the case that at least one heat-conducting element 4 is arranged on each longitudinal side L of the pole core 1b, wherein said at least one heat-conducting element bear(s) against the pole core 1b over as large an area as possible, particularly preferably against the entire longitudinal side L of the pole core 1b. The thus significantly increased thermal conductivity in the groove makes it possible to significantly improve the cooling path from the exciter coil 5 to the stator tooth 1.

As can be seen in FIG. 6b, the insulating body 2 bears with its inner side against the pole core 1b over the full area thereof and against regions of the magnetic return of the pole, that is to say of the pole return 1c and of the pole shoe 1a.

Each insulating body has an end-side region 2a which is adjoined, in the region of the transition from the pole core 1b to the pole shoe 1a, by a collar-like portion 2b. In the region of the transition from the pole core 1b to the pole return 1c, a collar-like portion 2c likewise bears against the central region 2a. The insulating body 2 not only bears against the end side 1 of the stator tooth 1 but also engages laterally around said end side and also bears against a short portion of the longitudinal side L of the stator tooth, in particular in the region of the pole core 1b, by way of its region 2d (FIGS. 6c and 6d). The region 2d furthermore has, on its outer surface in the region of the pole core 1b, channels for the guidance of the first layer of the coil wires of the exciter coil. The region of the pole core 1b forms, together with the pole return 1c and the pole shoe 1a, a groove N for receiving the coil wires or the winding.

FIG. 6e shows a possible embodiment of the heat-conducting element 4 according to the invention, which is formed as a rectangular plate with a thickness D. Here, the thickness D should advantageously be configured to be thicker than the thickness of the lateral projections 2d of the insulating parts 2, in order to ensure that the heat-conducting element 4 is in direct contact with the inner layer of the coil wires. The heat-conducting element 4 is composed of a material with high thermal conductivity (>5 W/mK) and simultaneously has a high electrical insulation capability. It may be manufactured for example from boron nitride.

FIG. 7 shows a further possible optimization possibility for the stator tooth according to the invention illustrated and described in FIGS. 6a-e. Here, in each case one insulating body 20 is arranged on the two winding heads of the stator tooth 1, wherein the insulating body 20, aside from the function of the electrical insulation and of improving the coil winding capability, also forms a holding device for the heat-conducting elements 4 arranged to both sides of the pole core 1b. Here, the heat-conducting element 4 may be the same as in the embodiment as per FIGS. 6a to 6e.

FIG. 8 shows a further possible embodiment of a stator tooth 1 according to the invention, in the case of which the electrical insulator 200 is injection-molded directly onto the stator core 1b. Here, during the process of encapsulation by injection molding, the upper collar 200b and the lower collar 200c and the groove base with channels 200a for improved wire guidance may be formed simultaneously. Furthermore, during the process of encapsulation by injection molding, one or more apertures 200e for heat-conducting elements 4a which can be placed in subsequently are kept free by means of at least one slide. Alternatively, the outer contour 200a may be exposed by machining after the process of encapsulation by injection molding.

FIG. 9 shows a further variant of the stator tooth injection-molded encapsulation, in the case of which the insulating body 7, 7a, 7b, 7c, 7d is injection-molded directly onto the stator core 1b in a process involving thermosetting plastic. The granulate that is used for the encapsulation of the stator by injection molding already comprises the ceramic additives required for optimized heat guidance. A component is thus created which is optimized in each case with regard to mechanical and thermal stability, degree of electrical insulation and heat-conducting action.

In the embodiments of FIGS. 6a-6e, 7 and 8, the insulating heat-conducting elements 4, 4a are fitted between coil and stator along the axial extent of the stator tooth and serve for considerably improved heat transfer between coil and stator over approximately the entire axial length of the stator. In the winding head region or end side S of the stator teeth 1, there are preferably provided wire-guiding and insulating plastics end pieces in the form of insulating bodies 2, 20, which may be mounted or applied by injection molding. Here, the heat-conducting elements 4, 4a may either be positioned in non-positively locking fashion by means of the insulating bodies 2, 20 or may be connected in positively locking fashion to the stator tooth, such that, as far as possible, a very small spacing and adequate stability are realized.

Alternatively, as illustrated and described in FIG. 8, the stator tooth may be encapsulated by injection molding with a standard plastic in an injection molding process involving thermosetting plastic, and a region along the side surfaces of the pole core 1b may be apertured such that one or more heat-conducting plates 4a or a composite concept with multiple heat-conducting elements can be introduced there in a subsequent step.

Furthermore, as illustrated in FIG. 9, the stator tooth may be completely encapsulated by injection molding, in an injection molding process involving thermosetting plastic, with a heat-conducting material with high specific conductance, for example boron nitride thermosetting plastic material. This is far less complex in terms of process technology than encapsulating the entire stator by injection molding, because the injection mold can be made considerably simpler. Also, it is not necessary here to attach importance to strength-increasing filler materials, it rather being possible to select exclusively a highly heat-conductive and at the same time insulating material.

In all of the embodiments described above, it is expedient for the stator to be potted or impregnated in order to as far as possible completely eliminate air inclusions between the copper wires and at the stator insulator close to the coil, and to thus further optimize the thermal transition between exciter coil and stator. As potting material, use may expediently be made of a material with acceptable heat-conducting characteristics, with a specific conductance of 0.25-1 W/mK. A potting material with moderate heat-conducting characteristics is always even better than air by a factor of 10, because air has a very low specific conductance of only 0.026 W/mK. Through the use of the potting material, the transition between the coil layers on the stator and the insulating foil and between the coil layers, for example first and second coil layer, can thus be considerably improved.

FIG. 10 shows an internal stator S with four different possible embodiments, which are illustrated in the four quadrants A-D. All internal stators in the quadrants A-D have in common the fact that the stator teeth are integrally connected to one another by means of an inner ring R. The internal stator may be of laminated design. The embodiments shown may self-evidently likewise be provided in the case of an external stator of an internal-rotor motor.

In the quadrant A, an embodiment is shown in which the entire stator 100 is encapsulated with a thermosetting plastic, as in the embodiment as per FIG. 5, with additional heat-conducting elements no longer being provided. The thermosetting plastic has a heat conductivity of greater than 1 W/mK. Optionally, the winding groove WN may, after the winding process, be potted or impregnated with an additional potting compound F in order to as far as possible completely eliminate air inclusions between the copper wires and at the stator insulator close to the coil, and thus further optimize the thermal transition between exciter coil and stator.

In the quadrant B, an embodiment is illustrated in which the stator teeth or pole cores 1b are encapsulated by injection molding with a thermosetting plastic, wherein apertures 200e are provided in the thermosetting plastic in the region of the longitudinal sides L of the pole cores 1b, into which apertures heat-conducting elements 4, 4a can be placed after the injection molding process. Here, the stator teeth may be designed analogously to those illustrated in FIG. 4.

The heat-conducting elements are formed so as to be thicker than the insulator, and preferably so as to be convex.

In the quadrants C and D, embodiments of a stator 100 according to the invention are illustrated in which an insulator 7 is provided by means of an injection molding process, analogously to the variants in quadrant A or B, wherein heat-conducting elements 4, 4a (not illustrated) may additionally be provided along the pole core longitudinal sides. On the groove base G of the winding grooves WN, there are also arranged additional insert parts 9, 10 which bear against the groove base G over the full area thereof and possibly have a wall which is curved correspondingly to the groove base G. Said insert parts 9, 10 are likewise formed as heat-conducting elements and preferably have high heat conductivity, in particular of greater than 5 W/mK. They may be produced for example from boron nitride. In the embodiment in the quadrant C, the insert parts 9 are of plate-like or shell-like form, whereas, in the quadrant D, they have a web-like projection extending in an axial direction, which projection presses with its two sides against the radial inner side of the windings 5. Additionally, it is also possible for heat-conducting elements 11 to be situated between the pole shoe 1a and the radial winding end 5a of the windings, which heat-conducting elements are produced from the same material as the parts 9, 10.

In this case, too, as illustrated and described in FIGS. 1 to 4, the magnetic circuits are guided or formed by means of U-shaped yokes which are formed by the tooth groups $ZG_i$. The tooth groups ZGi are connected to one another via the web ST, wherein the intermediate elements 21 are arranged between the tooth groups, webs ST and the exciter coils 5.

The invention claimed is:

1. An internal stator of a rotating-field machine, the internal stator including:
   a number, N, N >2, of stator teeth which together form a number, N/2, of tooth groups, wherein each respective stator tooth has one pole core and one pole shoe integrally formed thereon, wherein the one pole core of the respective stator tooth is manufactured from a ferromagnetic first material, wherein each respective one of the N/2 tooth groups is formed by two directly adjacently arranged stator teeth which, together with a magnetic return, are constituent parts of a magnetic circuit, wherein either:
   adjacent tooth groups of the tooth groups are connected to one another via webs and the pole cores of the tooth groups are integral with the magnetic return, whereby the webs and the magnetic returns are composed of the first material, or
   the stator teeth are, by way of a respective end of the pole core of each respective one of the stator teeth that is disposed on an opposite side from the respective end of the pole core at which the pole shoe of the respective one of the stator teeth is disposed, fastened to a connecting element in the form of a ring; and
   at least one intermediate element arranged between two adjacent stator teeth of two adjacent tooth groups, wherein the at least one intermediate element extends in an axial direction of the stator and is manufactured from a second material that differs from the first material,
   wherein the webs or the connecting element has, in a region between stator teeth, a first radial width, and wherein the magnetic return connecting the stator teeth of a given tooth group to one another has a second radial width or the connecting element together with the magnetic return inserted between the stator teeth of a given tooth group together have the second radial width, wherein the first radial width is smaller than the second radial width.

2. The internal stator as claimed in claim 1, wherein the second material has a density $\rho 2$ which is smaller, at least by a factor of 2, than a density pi of the first material, and wherein the second material has a heat conductivity $\kappa 2$ of greater than 100 W/mK, and is composed of aluminum or magnesium or an alloy of aluminum or magnesium.

3. The internal stator as claimed in claim 1, wherein the second material has a density $\rho 2$ which is smaller, at least by a factor of 3, than a density $\rho_1$ of the first material, and is plastic, and/or wherein the second material has a heat conductivity $\kappa > 5$ W/mK and comprises a plastic or aluminum oxide or nitride ceramic or silicon carbide or boron nitride.

4. The internal stator as claimed in claim 1, wherein a respective magnetic return associated with a tooth group is either formed integrally on ends, facing away from the pole shoes, of the pole cores of the stator teeth belonging to one tooth group, or is arranged between, and bears against, the pole cores of the stator teeth belonging to the tooth group.

5. The internal stator as claimed in claim 1, wherein adjacent tooth groups are connected to one another via webs which are composed of a same material as the pole cores and are manufactured integrally therewith, wherein a cross-sectional area of the webs in a magnetic flux direction is smaller than a cross-sectional area in a magnetic flux direction of the magnetic return.

6. The internal stator as claimed in claim 1, wherein the stator teeth are, by way of their ends of the pole cores opposite the pole shoes, fastened in non-positively locking fashion, by means of a connection which is positively locking in a radial and circumferential direction, in the form of a dovetail guide, or welded or adhesively bonded, to a connecting element which is in the form of a ring.

7. The internal stator as claimed in claim 1, further including:
   at least one heat-conducting element in contact with a respective intermediate element and arranged between an exciter coil and one of the stator teeth.

8. The internal stator as claimed in claim 7, wherein the heat-conducting element is configured as a molded piece, such that one or more coil layers of exciter coils of adjacent teeth are directly in contact with the molded piece or have a small spacing thereto, and a thermal connection exists.

9. The internal stator as claimed in claim 8, wherein the heat-conducting element, for radial heat dissipation from exciter coil radially inward to one of the intermediate elements, has a heat conductivity of greater than 5 W/mK and is produced from aluminum oxide or nitride ceramic or silicon carbide or boron nitride.

10. The internal stator as claimed in claim 1, further including at least one heat conductor arranged in or on the at least one intermediate element, wherein the at least one heat conductor comprises a water channel of a water-type cooling arrangement or heatpipe, wherein the heat conductor extends in an axial direction of the internal stator and serves for the dissipation of heat in an axial direction.

11. The internal stator as claimed in claim 1, further comprising at least one exciter coil comprising coil wire windings arranged in winding grooves formed between adjacent stator teeth and having space between the windings, wherein the space between the windings in the winding grooves is potted with an additional potting compound with a heat conductivity of at least 0.25 W/mK and such that there are substantially no air inclusions between the coil wires of the windings.

12. The internal stator as claimed in claim 1, further including an inner ring, wherein a stator tooth of the N stator teeth is fastened to the inner ring using a positively locking connection or a stator tooth of the N stator teeth engages radially into a recess of the inner ring and is held in position by a wedge-shaped cross-section of an intermediate element of the at least one intermediate element.

13. The internal stator as claimed in claim 1, wherein the two stator teeth of a respective tooth group are composed of a ferromagnetic material and, together with the magnetic return, which has a magnetic direction perpendicular to a magnetic direction of the pole core of one of the two stator teeth, and/or a ferromagnetic inner ring, form a part of a magnetic circuit, wherein the part of the magnetic circuit is U-shaped.

14. The internal stator as claimed in claim 1, wherein the pole shoe of a respective stator tooth is held by positive locking to the pole core of said respective stator tooth.

15. The internal stator as claimed in claim 1, wherein adjacent stator teeth bear differently wound exciter coils to optimize a copper filling ratio, wherein the exciter coils are geometrically shaped such that said exciter coils do not make contact with one another as they are pushed onto the adjacent stator teeth and/or in a state in which they have been pushed onto the adjacent stator teeth.

16. The internal stator (S) as claimed in claim 1, wherein the internal stator is completely encapsulated by injection molding with a material composed of thermoplastic or thermosetting plastic, which has a heat conductivity of $\kappa > 1$ W/mK.

17. The internal stator as claimed in claim 1, wherein a stator tooth of the N stator teeth has longitudinal sides and end sides and is entirely or regionally covered or encased by an electrical insulator that serves for electrical insulation of a winding with respect to the stator tooth, wherein the electrical insulator is of single-part or multi-part form, and wherein at least one part or region of the electrical insulator, or the entire electrical insulator, is formed from a material with a heat conductivity characteristic of greater than 1 W/mK.

18. The internal stator as claimed in claim 11, wherein the electrical insulator has two insulating bodies that engage around, in each case, one end side, and which, at their side facing toward the at least one exciter coil, have channels for coil wires of the at least one exciter coil.

19. The internal stator as claimed in claim 17, further including at least one fixed and dimensionally stable heat-conducting element, in the form of a plate, wherein the at least one heat-conducting element bears against at least one longitudinal side of the pole core and/or the pole shoe of the stator tooth.

20. The internal stator as claimed in claim 19, wherein the at least one heat-conducting element is arranged between two insulating bodies, wherein the at least one heat-conducting element has a heat conductivity of greater than 5 W/mK, is manufactured on the basis of ceramic or silicon carbide or from boron nitride composite materials, and/or the at least one heat-conducting element has a heat conductivity which is greater at least by a factor of 2 than that of the insulating bodies.

21. The internal stator as claimed in claim 19, wherein the at least one heat-conducting element is manufactured from ceramic or on the basis of ceramic and has both electrically insulating characteristics and a thermal conductivity of >10 W/mK.

22. The internal stator as claimed in claim 17, wherein the electrical insulator is formed by encapsulation at least of the pole core of the stator tooth by injection molding, wherein a potting material used in the injection molding is a thermoplastic or a thermosetting plastic, wherein the thermosetting plastic has a heat conductivity of greater than 1 W/mK.

23. The internal stator as claimed in claim 22, wherein the electrical insulator has at least one window-like aperture or a recess with a thin-walled region for receiving at least one heat-conducting element in positively locking fashion, wherein the heat-conducting element is arranged laterally on the pole core of the stator tooth, and has a heat conductivity of greater than 5 W/mK, and is manufactured from boron nitride.

24. The internal stator as claimed in claim 23, wherein the electrical insulator and the at least one heat-conducting element are placed in before the injection molding process and are jointly encapsulated by injection molding.

25. A rotating-field machine comprising the internal stator as claimed in claim 1.

26. A method for producing an internal stator as claimed in claim 1, the method comprising:
  winding exciter coils on winding bodies;
  pushing the windings wound on the winding bodies from outside the internal stator onto the pole cores of the N stator teeth; and
  fastening the pole shoes to the respective pole cores of the N stator teeth.

27. The internal stator as claimed in claim 2, wherein the second material has a heat conductivity greater than 200 W/mK.

28. The internal stator as claimed in claim 3, wherein the second material has a density that is smaller by a factor of 5 than a density of the first material.

29. The internal stator as claimed in claim 6, wherein the positively locking connection is in the form of a dovetail guide.

30. The internal stator as claimed in claim 10, wherein the working medium is water or ammonia.

31. The internal stator as claimed in claim 12, wherein the stator tooth of the N stator teeth is fastened to the inner ring using a dovetail guide.

32. The internal stator as claimed in claim 14, wherein the pole shoe of the respective stator tooth is pressed in or adhesively bonded, or is also fixed using a potting compound, to the pole core of the respective stator tooth.

33. The internal stator as claimed in claim 16, wherein the material has a heat conductivity of $\kappa > 2.5$.

34. The internal stator as claimed in claim 17, wherein at least one part or region of the electrical insulator, or the entire electrical insulator, is formed from a material with a heat conductivity characteristic greater than 2.5 W/mK.

35. The internal stator as claimed in claim 20, wherein the at least one heat-conducting element is arranged in recesses of the insulating bodies.

36. The internal stator as claimed in claim 20, wherein the at least one heat-conducting element has a heat conductivity of greater than 10 W/mK.

37. The internal stator as claimed in claim 20, wherein the at least one heat-conducting element has a heat conductivity of greater than 20 W/mK.

38. The internal stator as claimed in claim 20, wherein the at least one heat-conducting element has a heat conductivity that is greater by a factor of 5 than a heat conductivity of the insulating bodies.

39. The internal stator as claimed in claim 21, wherein the at least one heat-conducting element comprises aluminum oxide or nitride ceramic or silicon carbide or boron nitride.

40. The internal stator as claimed in claim 22, wherein the electrical insulator or at least one of the insulating bodies is formed by encapsulation of at least the pole core of the stator tooth by injection molding.

41. The internal stator as claimed in claim 22, wherein the thermosetting plastic has a heat conductivity of greater than 5 W/mK.

42. The internal stator as claimed in claim 23, wherein the heat-conducting element bears against the pole core of the stator tooth.

\* \* \* \* \*